(12) United States Patent
Wyeth et al.

(10) Patent No.: US 6,614,957 B2
(45) Date of Patent: Sep. 2, 2003

(54) OPTICAL CONFIGURATION FOR IMPROVED LENS PERFORMANCE

(75) Inventors: Newell Convers Wyeth, Oakton, VA (US); Edward Alan Phillips, Great Falls, VA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 09/995,630

(22) Filed: Nov. 29, 2001

(65) Prior Publication Data

US 2002/0071635 A1 Jun. 13, 2002

Related U.S. Application Data (60) Provisional application No. 60/251,863, filed on Dec. 8, 2000, and provisional application No. 60/251,878, filed on Dec. 8, 2000.

(51) Int. Cl.[7] .............................. G02B 6/32; G02B 6/06
(52) U.S. Cl. ...................... 385/33; 385/35; 385/116; 385/119; 369/44.12; 369/112.27
(58) Field of Search ............................ 385/33–35, 38, 385/49, 89, 116, 119, 120, 121, 900, 901, 129, 132; 369/44.12, 44.13, 112.27

(56) References Cited

U.S. PATENT DOCUMENTS

| 4,874,220 A | 10/1989 | Yamagata ............... 350/96.26 |
|---|---|---|
| 5,278,812 A | 1/1994 | Adar et al. ............ 369/44.12 |
| 5,289,454 A | 2/1994 | Mohapatra et al. ......... 369/112 |
| 5,630,788 A | * 5/1997 | Forkner et al. ............ 600/182 |
| 6,137,105 A | 10/2000 | Drobot et al. ............. 250/234 |
| 6,166,756 A | 12/2000 | White et al. .............. 347/239 |
| 6,215,593 B1 | 4/2001 | Bruce ...................... 359/619 |
| 6,246,658 B1 | 6/2001 | White et al. ........... 369/112.27 |

OTHER PUBLICATIONS

International Search Report for Application No. PCT/US01/44926, dated Jul. 11, 2002 (mailing date).
International Search Report for Application No. PCT/US01/44954, dated May 14, 2002 (mailing date).
Written Opinion for Application No. PCT/US01/44954, dated Sep. 17, 2002 (mailing date).
T. Maeda, S. Ogata, and K. Imanaka, "Optical Characteristics of Micro Fresnel Lens for High Density Memory System," *Optical Data Storage*, Proc. SPIE. vol. 1316, pp. 210–214, 1990.
Preliminary Examination Report for Application No. PCT/US01/44954, dated Dec. 10, 2002 (mailing date).

* cited by examiner

*Primary Examiner*—Hemang Sanghavi
(74) *Attorney, Agent, or Firm*—Kilpatrick Stockton LLP (57) ABSTRACT

Described herein is a system and method for extending the performance of a simple lens system with curvature of field to image a set of optical light guide sources extended over a wide field of view. Embodiments are applicable to systems using integrated optical light guides as the sources for imaging. Further, the systems and methods allow for a wide field of view using simple aspheric lenses with resulting savings in complexity, size, mass, and cost.

22 Claims, 6 Drawing Sheets

OPTICAL CONFIGURATION FOR IMPROVED LENS PERFORMANCE

CROSS-REFERENCE TO RELATED APPLICATIONS

This application claims priority to and incorporates by reference U.S. Provisional Application Nos. 60/251,863 and 60/251,878 both filed Dec. 8, 2000 entitled "Optical Waveguide Configuration for Improved Lens Performance" and "Optical Waveguide Configuration for Focus Sensing," respectively. Further, the following patents and applications are herein incorporated by reference: "Multiple Parallel Source Scanning Device" (U.S. Pat. No. 6,137,105); "Multiple Channel Data Writing Device" (U.S. Pat. No. 6,166,756); "Multiple Channel Scanning Device Using Optoelectronic Switching" (U.S. Pat. No. 6,246,658); "Method and Apparatus for Controlling the Focus of a Read/Write Head for an Optical Scanner" (U.S. application Ser. No. 09/088,781); and "Optical Configuration for Focus Sensing" (U.S. application Ser. No. 09/942,591 filed Aug. 31, 2001).

BACKGROUND OF THE INVENTION

1. Field of the Invention

This invention relates generally to the field of optical imaging. More particularly, the invention relates to the field of imaging through improved beam source and lens configurations.

2. Description of the Related Art

Many optical devices involve collecting light from a source (such as a laser) and manipulating it with a lens system. The lens system may be used to project the light as a collimated beam or to focus the light to a concentrated spot. For example, optical scanning of a surface is generally done with a focused spot to provide localized interaction with a small area of the surface at any one time. Optical scanners have been developed for a variety of uses including optical data storage, bar code readers, image scanning for digitization or xerography, laser beam printers, inspection systems, densitometers, and 3-dimensional scanning (surface definition, surface characterization, robotic vision). In these scanning applications, the light spot is scanned over a surface for either "reading" the surface (i.e., producing a return signal that carries information about some local property of the surface) or "writing" to the surface (i.e., causing a localized change in a property of the surface material). In a typical compact disk (CD) reader, light from a discrete laser diode is focused by a lens system to illuminate a spot that scans a single data track of the CD.

In many optical devices that image a source to a scanning spot, the rate at which information is read or written can be increased through the use of multiple sources and multiple spots. Zen Research, Inc. has recently introduced a CD-ROM drive that uses a diffraction grating to split the output beam of a single conventional diode laser into seven parallel beams that are focused to spots on seven adjacent data tracks of the CD. The sources for the seven spots are images of the laser created by the grating. The return signals from the spots are read by a multiple element detector to give seven parallel, simultaneous read channels. Only the center beam is used for focusing and tracking because the other beams are sent through the same objective lens and are focused and aligned with their respective tracks along with the center beam. That system is for reading only.

SUMMARY OF THE INVENTION

Summary of the Problem

There is a need in the art for an inexpensive, near diffraction-limited optical system that provides independently controllable spots (e.g., for writing), such as those wherein light for the multiple sources originates from different lasers. Current optical writing systems that meet the requirements for compactness, incorporate a single-lens system for collecting and focusing light from the multiple sources. Within these conventional single-lens systems, satisfactory (i.e., near-diffraction-limited) focusing performance has been achieved when the multiple sources are placed within a field of view limited by the lens system design. Further, while most aberrations in inexpensive lenses can be corrected using modern molding technology to reproduce aspheric or binary-diffraction lens surfaces, curvature of field is only correctable with costly lens designs involving many elements.

Summary of the Solution

The present invention provides a method for imaging light from a set of integrated optical light guides arranged over an extended field of view with a simple, inexpensive lens system. The invention contributes to high performance in the form of a reliable, robust, manufacturable, low-cost component for optical devices used for optical data storage, bar code readers, image scanning for digitization or xerography, laser beam printers, inspection systems, densitometers, and 3-dimensional scanning (surface definition, surface characterization, robotic vision).

Integrated optics can be used to direct multiple light sources through parallel light guides toward the same focusing lens, which images the light guide exit apertures onto separate spots. Re-imaging returns the light reflected from each spot to the light guide from which it originated, where it can be separately detected. With integrated optics, the number of parallel light guides acting as sources can be increased as necessary. However, the light guides must occupy different positions in the field of view of the lens. Using integrated optics fabrication methods, it is easiest to arrange them in a straight line so that the light guides can be fabricated in a single flat sheet of material and terminate with their exit apertures along one edge facing the lens. If the light guides are spaced at a constant distance from each other, every time a light guide is added to increase the number of sources, it occupies a position in the lens field of view that is further away from the lens axis. For a simple lens system, the number of light guides that can be satisfactorily imaged is limited to those within the field of view set by curvature of field effects. In addition, as sources are positioned further from the optical axis of the lens system, their light may be partially cut off by the limiting aperture of the lens system (an effect called vignetting) if the axis of the emitted cone of light is still parallel to the optical axis. Lens systems can be designed that accept light cones parallel to the optical axis without vignetting; such systems may be oversize, telecentric, or both, resulting in increased bulk and cost. A single lens requires light cones that are directed at the center of the lens, so that the entire lens is illuminated for best light efficiency and smallest focal spot size. A simple lens system may require light cones directed either toward or away from the optical axis, depending on system details; the light must be centered on the limiting aperture of the system, which may not be the first lens encountered.

The present invention extends the performance of a simple lens system with curvature of field to image a set of optical light guide sources extended over a wide field of view. The invention is applicable to systems using integrated optical light guides as the sources for imaging. It can allow such systems to use a wide field of view with simple aspheric lenses with resulting savings in complexity, size, mass, and cost.

Other features, advantages, and embodiments of the invention are set forth in part in the description that follows, and in part, will be obvious from this description, or may be learned from the practice of the invention.

BRIEF DESCRIPTION OF THE DRAWINGS

The foregoing and other features and advantages of this invention will become more apparent by reference to the following detailed description of the invention taken in conjunction with the accompanying drawings. In the Figures.

DETAILED DESCRIPTION OF THE PREFERRED EMBODIMENTS OF THE INVENTION

As sources are imaged further and further from the optical axis of a lens system (i.e., the central axis of the lens), the performance of the lens starts to fall off. The present invention allows diffraction-limited imaging of the waveguide exit apertures by a simple lens system for waveguides positioned well off the optical axis where curvature of field of the lens is significant.

The present invention applies to an integrated optics system or an optical fiber system. While the following discussion, embodiments and figures use an integrated optics chip as an example, it is contemplated in at least one embodiment of the present invention that fiber optics may be used. Further, one skilled in the art recognizes the various multiple source, light guide systems that may be used as a component in the optical systems described herein. An integrated optics chip (e.g., an integrated photonics chip) is an optical circuit manufactured using the same processes that are used to manufacture integrated circuits for electronics, including, but not limited to, photolithography, sputtering, laser deposition, chemical deposition, vapor deposition, wet and/or dry etching, thermal processing, or deposition using ink jet technology. The integrated optics chip implementation, according to the present invention, has a set of waveguides that illuminate an imaging lens system. The waveguides are similar to fiber optics in that the waveguides have a core index material that is embedded in a lower index cladding. The cross-section of a waveguide is generally rectangular, although other shapes may be used, including but not limited to circular. In addition, light traveling through waveguides behaves similarly to, and can be manipulated much like, fiber optics.

FIGS. 1–4 show integrated optics chip 50 having a set of waveguides 10 whose exit apertures 15 are positioned along a curved line. This curve, according to at least one embodiment of the present invention, lies in the Petzval surface of the lens system 70. The Petzval surface of a lens is a paraboloidal surface on which the image of a planar object is located when there is no astigmatism. That is, the curve is chosen to produce the desired position of the image points on a planar surface 90. According to an embodiment of the present invention, the curve of the waveguide exit apertures corrects for the curvature of field aberration in the lens system 70. In this embodiment, the exit apertures 15 act as sources for a focus lens system 70 and are imaged as focused spots 80 on a planar surface 90. Re-imaging by the lens system 70 returns the light reflected from each spot on the surface 90 to the waveguide from which it originated. Light coming out of an exit aperture of a waveguide 10 is very similar to a laser in that it has a defined mode and that it can be focused on the surface 90 to a spot close to the theoretical minimum in size. According to an embodiment of the present invention, the surface 90 can be any planar surface that reflects light, including but not limited to, tape, disks, cards, print media, and labels. The waveguides are driven by at least one laser source, light-emitting diode (LED), or other appropriate source. According to another embodiment of the present invention, splitters and/or couplers are used in the integrated optics chips 50 so that several waveguides are driven by a single laser source.

Figure 1:
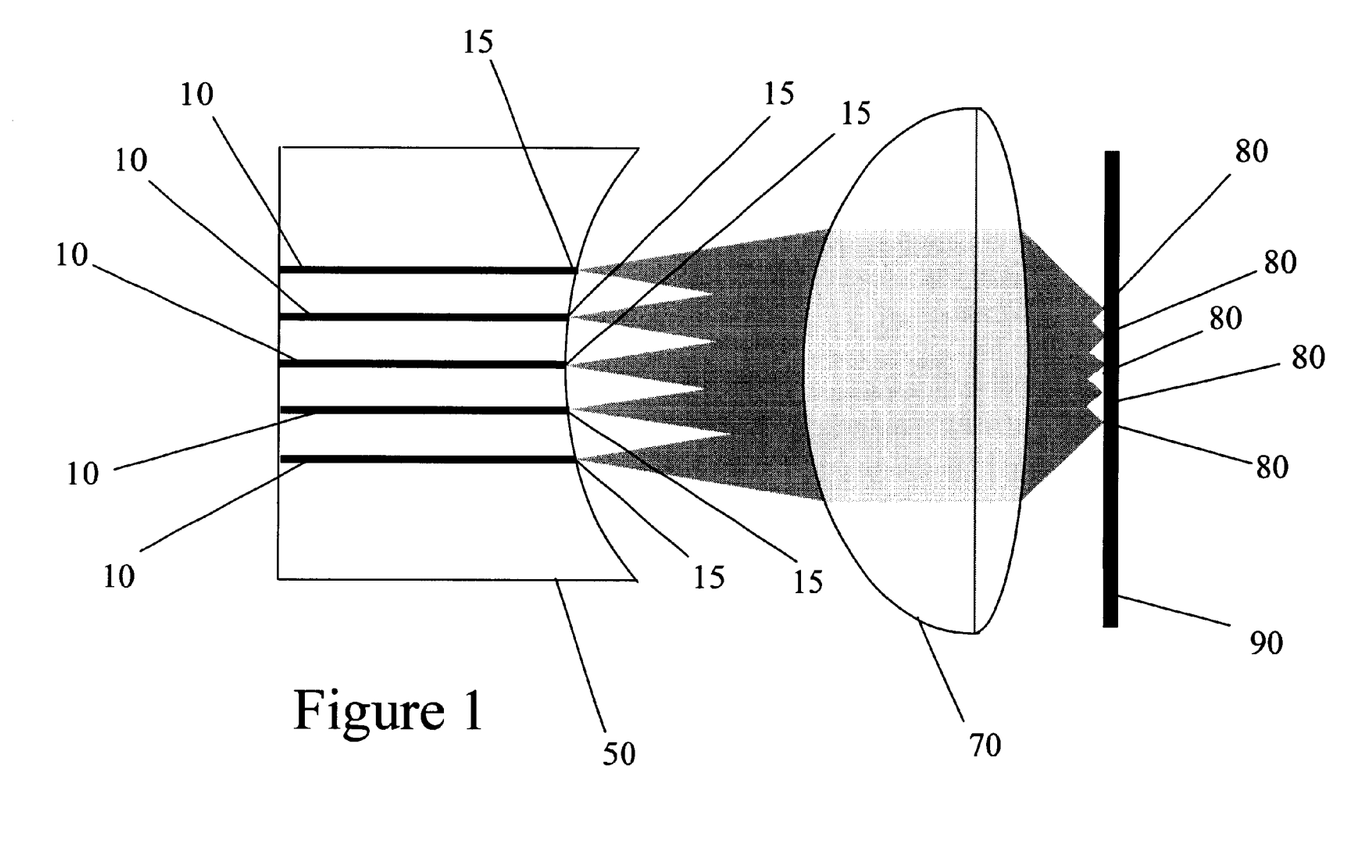
FIG. 1 shows an invention embodiment with the edge of the integrated optics chip and the waveguides cut to compensate for the curvature of field aberration of the lens system.

Specifically, FIG. 1 shows an embodiment of the present invention where an edge of the integrated optics chip 50 is cut so that the exit apertures 15 of the waveguides 10 lie along the cut edge of the integrated optics chip and lie along a curve. As stated above, in an embodiment to produce image points lying in a single planar surface 90, the curve of the exit apertures lies in the Petzval surface of the lens system 70. Other embodiments may use other curves to locate the exit apertures 15 in order to produce other positions of the image points. The integrated optics chip 50 may be cut or diced using any conventional technique, including, but not limited to, laser ablation, microtoming, or wafer sawing.

Figure 2:
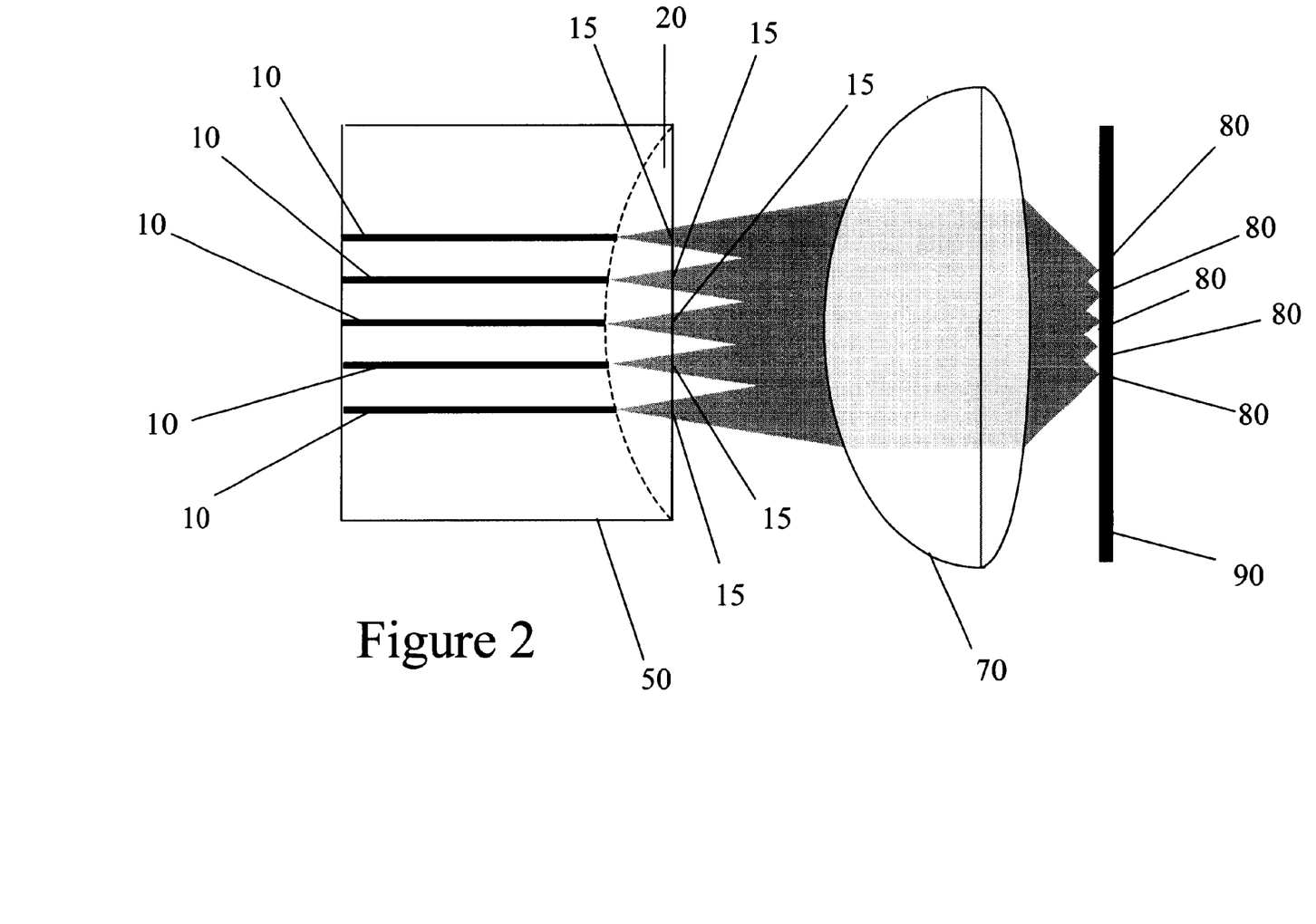
FIG. 2 shows an invention embodiment with the waveguides fabricated with different lengths in the integrated optics chip to compensate for curvature of field of the lens system.

FIG. 2 shows another embodiment of the present invention wherein the waveguides 10 terminate inside the integrated optics chip cladding material 20. Light diverges from the waveguide ends, first inside and then outside the medium (i.e., the integrated optics chip cladding material), establishing the exit aperture locations 15. In this way the waveguide exit apertures 15 can be made to lie on the proper curve (e.g., a curve in the Petzval surface of the lens) as part of the integrated optics fabrication process using conventional fabrication techniques including, but not limited to, photolithography, combined with etching, photopolymerization, and/or material deposition techniques. For example, in the case of photo-defined waveguides, this is accomplished by simply drawing the fabrication photomask to make the waveguides 10 terminate at the correct positions along the curve.

Figure 3:
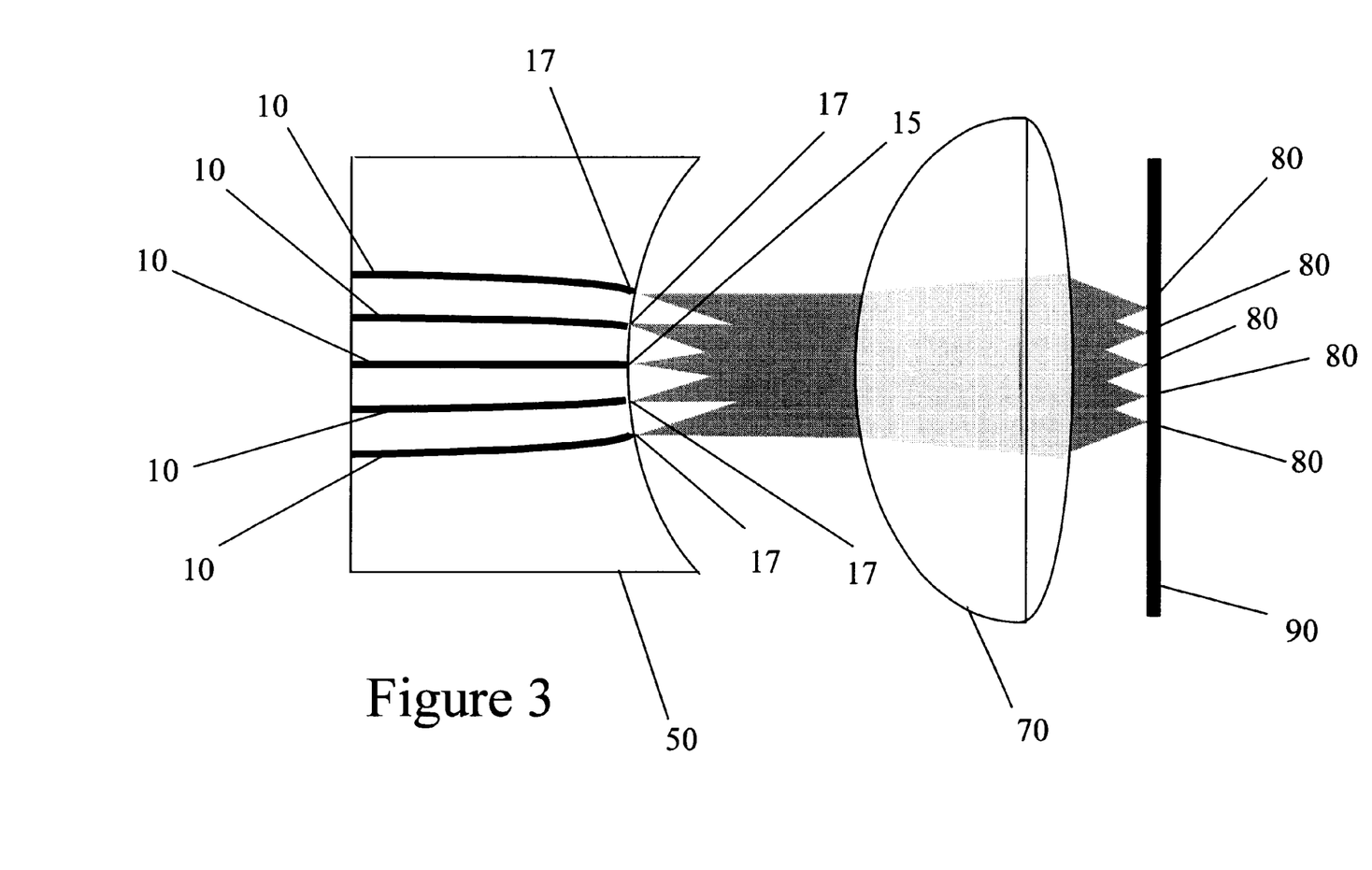
FIG. 3 shows an invention embodiment with the waveguides curved to aim at the center of the limiting aperture of the lens system to reduce vignetting, wherein the waveguides are cut to compensate for the curvature of field of the lens system.
Figure 4:
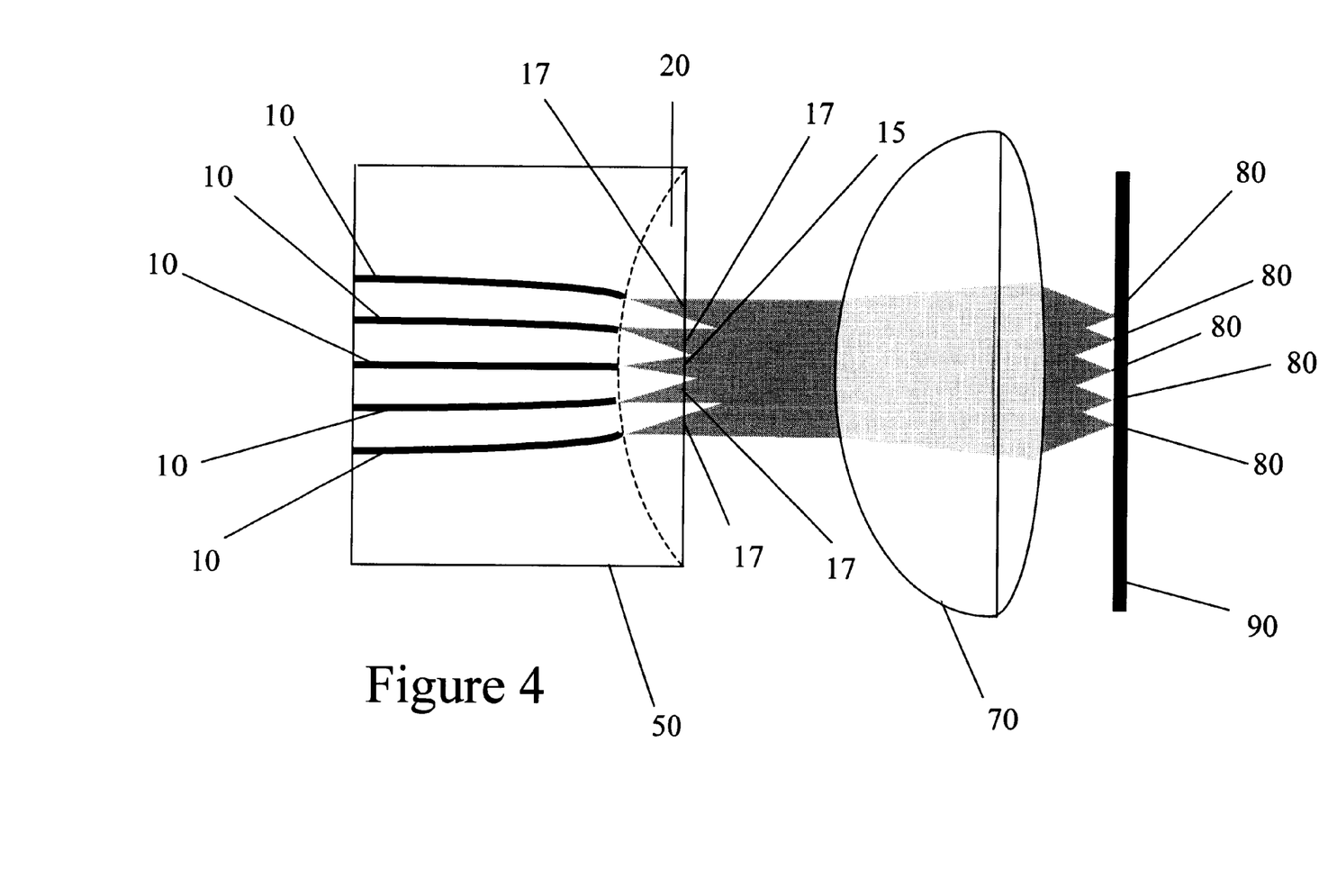
FIG. 4 shows an invention embodiment with the waveguides curved to aim at the center of the limiting aperture of the lens system to reduce vignetting, wherein the waveguides are fabricated with different lengths in the integrated optics chip to compensate for curvature of field of the lens system.

By modifying the embodiments of the present invention described herein and shown in FIGS. 1 and 2, the vignetting resulting from off-axis source placement is eliminated. According to at least one embodiment, as shown in FIGS. 3 and 4, this is accomplished by curving the waveguides 10 so that the waveguides better illuminate the center of the limiting aperture of the lens 70. Specifically, for off-axis waveguide exit apertures 17, the waveguides are curved toward the center of the limiting aperture of the lens 70. The curves are designed so that the diverging light exiting the off-axis waveguide is aimed at the center of the lens, similar to the light from the on-axis center waveguide. Because lens 70 as drawn is a single lens, its limiting aperture is located within the lens. According to an embodiment of the present invention shown in FIG. 3, an edge of the integrated optics chip may be cut or diced so that the exit apertures 15 and 17 of the waveguides 10 lie along the cut edge of the integrated optics chip and form a curved line. The integrated optics chip 50 may be cut or diced using any conventional technique, including, but not limited to, laser ablation, microtoming, or wafer sawing. According to another embodiment of the present invention as shown in FIG. 4, the waveguides 10 are fabricated so that they terminate inside the integrated optics chip cladding material 20. Any conventional integrated optics fabrication technique may be used including, but not limited to, photolithography, combined with etching, photopolymerization, and/or material deposition techniques. The light diverging from the waveguide exit apertures will be refracted as it exits the edge of the integrated optics chip. In this embodiment, the refraction of light from the off-axis waveguides will be different from that of the on-axis waveguides because the integrated optics chip edge is not normal to the line from the exit aperture to the lens center. This change in refraction can be taken into account when the pointing direction of the off-axis waveguides is chosen.

Figure 5:
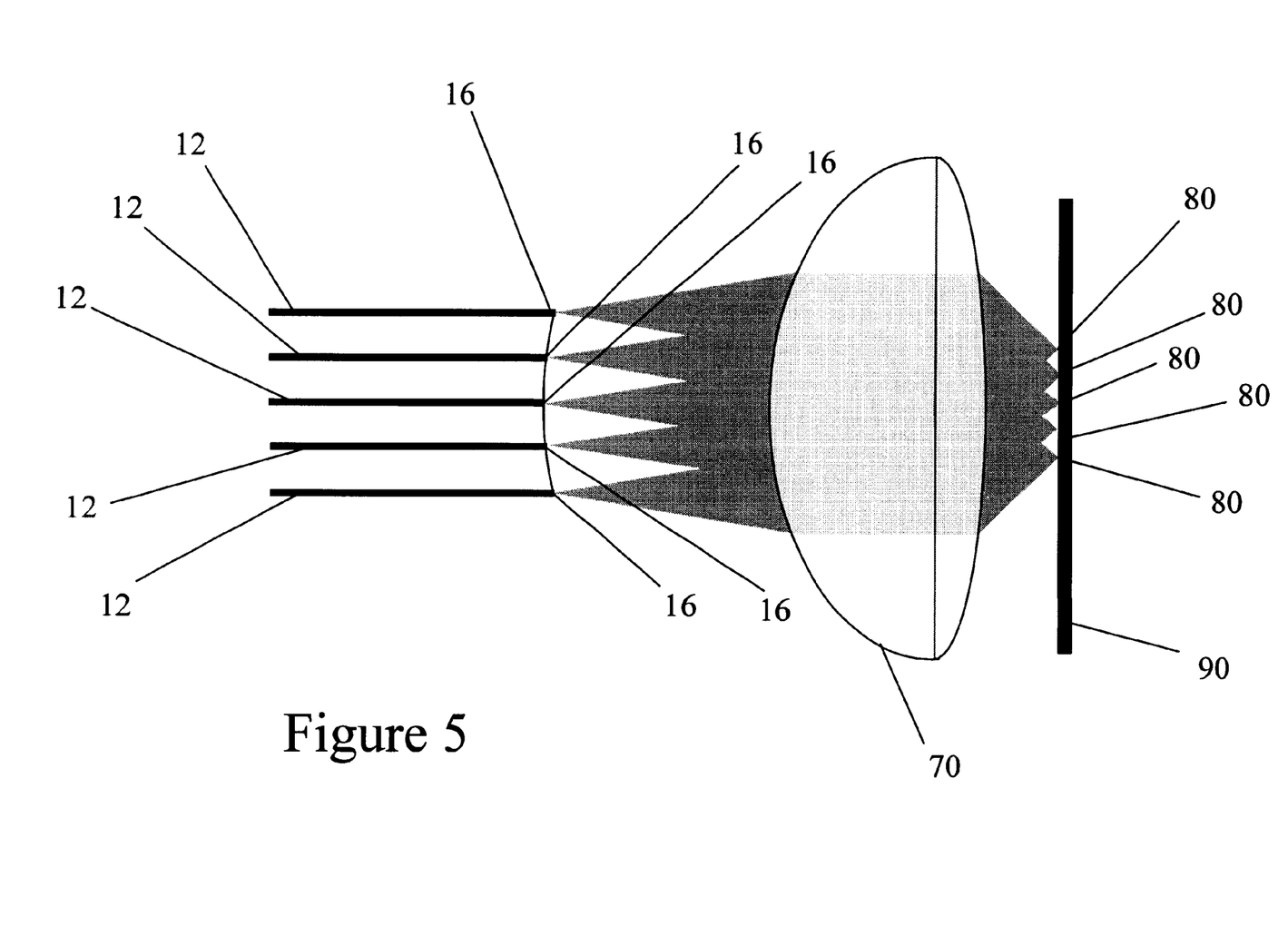
FIG. 5 shows an invention embodiment utilizing fiber optics with the ends of the fibers cut to compensate for curvature of field of the lens system.
Figure 6:
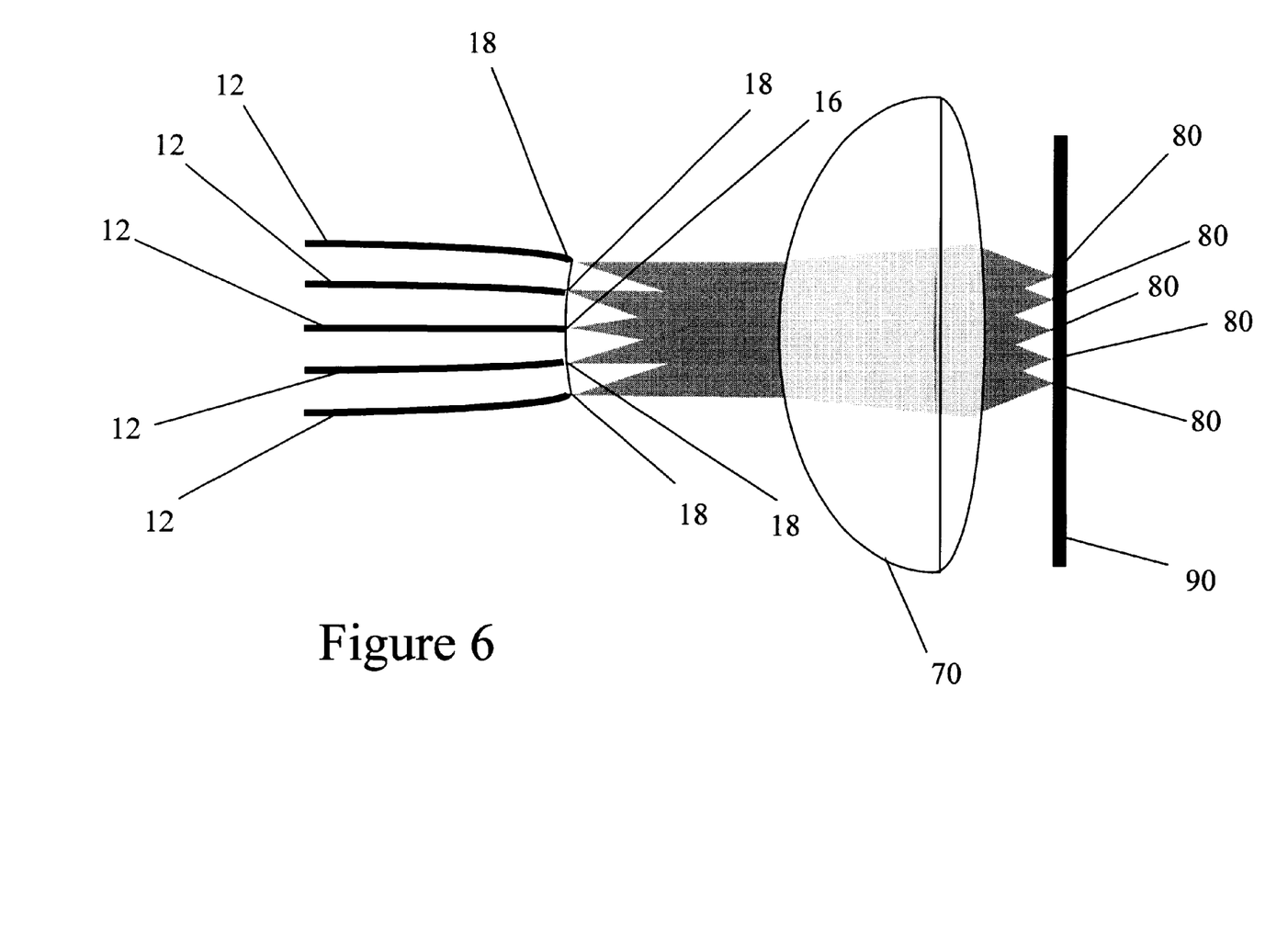
FIG. 6 shows an invention embodiment utilizing fiber optics with the ends of the fibers cut to compensate for curvature of field of the lens system and with the fibers curved to aim at the center of the limiting aperture of the lens system to reduce vignetting.

FIG. 5 shows an additional embodiment of the present invention, wherein fiber optics (i.e., optical fibers) are used in place of the optical waveguides described above in relation to FIGS. 1–4. In this embodiment, a group of fibers 12 are held in place by some type of supporting means, integrated or non-integrated (not shown). According to the embodiment, the ends of the fibers 16 are cut so that they follow a curved line. In one embodiment, this curve lies in the Petzval surface of the lens 70. That is, the curve is chosen to produce the desired position of the image points on a planar surface 90. The fibers 12 may be cut or diced using any conventional technique, including, but not limited to, laser ablation, microtoming, or sawing. Likewise, according to another embodiment as shown in FIG. 6, the off-axis fiber ends 18 may also be curved so that the light diverging from the fibers 12 is better directed toward the center of the limiting aperture of the lens 70, thereby eliminating the vignetting resulting from off-axis source placement.

Other embodiments and uses of the present invention will be apparent to those skilled in the art from consideration of this application and practice of the invention disclosed herein. The present description and examples should be considered exemplary only, with the true scope and spirit of the invention being indicated by the following claims. As will be understood by those of ordinary skill in the art, variations and modifications of each of the disclosed embodiments, including combinations thereof, can be made within the scope of this invention.

What is claimed is:

1. An optical system comprising:
   a plurality of structures capable of guiding optical energy, wherein each of the plurality of structures has a front end and wherein the front ends of the plurality of structures are aligned so as to lie along a curve; and
   a lens for receiving the optical energy from the plurality of structures and focusing the optical energy onto a surface, wherein the optical energy from the surface can be re-imaged back into the plurality of structures.

2. The system of claim 1, wherein the curve is the Petzval surface of the lens.

3. The system of claim 1, wherein the plurality of structures are integrated into an optics chip.

4. The system of claim 3, wherein the plurality of structures are waveguides.

5. The system of claim 3, wherein the edge of the integrated optics chip is cut so that an edge of the integrated optics chip corresponds to the front ends of the plurality of structures.

6. The system of claim 3, wherein the integrated optics chip comprises cladding material and wherein the front ends of the plurality of structures terminate within the cladding material.

7. The system of claim 1, wherein the plurality of structures are optical fibers.

8. The system of claim 1, wherein each of the plurality of structures is curved in order to direct the optical energy from each of the plurality of structures towards the center of the limiting aperture of the lens.

9. A method for improving lens performance in an optical system, wherein the optical system includes a plurality of structures capable of guiding optical energy, wherein each of the plurality of structures has a front end and further wherein the optical energy passes through a lens, the method comprising:
   aligning the front ends of each of the plurality of structures relative to the lens so that the front ends lie along a curve,
   wherein the curve is selected so as to focus all of the optical energy into spots on a surface and allow re-imaging by the lens of optical energy reflected from the spots on the surface back into the front ends of the plurality of structures.

10. The method of claim 9, wherein the surface is planar and the curve is the Petzval surface of the lens.

11. The method of claim 9, wherein the plurality of structures are waveguides contained in an integrated optics chip.

12. The method of claim 11, wherein an edge of the integrated optics chip is cut so that the edge of the integrated optics chip corresponds to the front ends of the plurality of structures.

13. The method of claim 11, wherein the integrated optics chip comprises cladding material and wherein the front ends of the plurality of structures terminate within the cladding material.

14. The method of claim 9, wherein the plurality of structures are optical fibers.

15. The method of claim 9, wherein each of the plurality of structures is curved in order to direct the optical energy from each of the plurality of structures towards the center of the limiting aperture of the lens.

16. An optical waveguide system comprising:
   a plurality of read/write waveguides, wherein the plurality of read/write waveguides are for reading information from a surface, writing information to the surface or both reading information from the surface and writing information to the surface, wherein each of the plurality of read/write waveguides has a front end, wherein the front ends of the plurality of read/write waveguides are aligned so as to lie along a curve, and further wherein optical energy traveling through the plurality of waveguides passes through a lens, is focused on a surface, and is at least partially reflected off of the surface and back through the lens such that the at least partially reflected optical energy is collected by the plurality of read/write waveguides.

17. The system of claim 16, wherein the surface is planar and the curve is the Petzval surface of the lens.

18. The system of claim 16, wherein the plurality of read/write waveguides are included in an integrated optics chip.

19. The system of claim 18, wherein the front ends of the plurality of read/write waveguides are aligned with an edge of the integrated optics chip.

20. The system of claim 18, wherein the integrated optics chip comprises cladding material and wherein the front ends of the plurality of read/write waveguides terminate within the cladding material.

21. The system of claim 16, wherein each of the plurality of read/write waveguides is curved in order to direct the optical energy from each of the plurality of read/write waveguides towards the center of the limiting aperture of the lens.

22. An optical system comprising:

a plurality of structures capable of guiding optical energy; and a lens for receiving the optical energy from the plurality of structures and focusing the optical energy onto a surface, wherein the optical energy from the surface can be re-imaged back into the plurality of structures, and further wherein each of the plurality of structures is curved in order to direct the optical energy from each of the plurality of structures towards the center of the limiting aperture of the lens.

* * * * *